July 10, 1945. W. C. RICHARDSON 2,380,264
CINDER DRAINING AND DISPOSAL PLANT
Filed May 3, 1944 3 Sheets-Sheet 2

INVENTOR,
W. C. RICHARDSON
BY Featherstonhaugh & Co.
ATTORNEYS

July 10, 1945.   W. C. RICHARDSON   2,380,264
CINDER DRAINING AND DISPOSAL PLANT
Filed May 3, 1944   3 Sheets-Sheet 3

INVENTOR
W. C. RICHARDSON
BY Fetherstonhaugh & Co.
ATTORNEYS

Patented July 10, 1945

2,380,264

UNITED STATES PATENT OFFICE 2,380,264

CINDER DRAINING AND DISPOSAL PLANT

Walter C. Richardson, Montreal, Quebec, Canada

Application May 3, 1944, Serial No. 534,003
In Canada February 2, 1944

9 Claims. (Cl. 198—53)

This invention relates to improvements in cinder draining and disposal plants of the type disclosed in my prior Canadian Patent No. 260,413, granted May 4, 1926.

One improvement afforded by the present invention consists in the provision of a simplified arrangement of the conveyor supporting structure which enables the tower formerly employed for supporting the discharge end of the conveyor assembly and for housing the conveyor drive mechanism to be replaced by a simple supporting frame located adjacent the said discharge end of the conveyor assembly. In the simplified arrangement the drive mechanism is located at grade level in driving engagement with the descending return flight of the conveyor.

Another improvement consists in the provision of multiple speed driving mechanism for selectively driving the conveyor at any one of several predetermined speeds dependent upon weather conditions or the amount of cinders to be handled at a given time. In warm weather the conveyor is preferably driven at a relatively slow speed to allow greater time for drying the cinders as they are carried from the receiving to the discharge end of the conveyor. In colder weather, or when it is necessary to handle a large amount of cinders, it is desirable that the conveyor be driven at a higher rate of speed for at least a part of the time. For example, it is sometimes desirable to drive the conveyor at a relatively high speed for a period sufficient to quickly empty the hopper through which the cinders are delivered to the conveyor and to drive the conveyor at a slower speed in order to ensure substantial drainage of water from the cinders before they reach the discharge end of the conveyor.

A further improvement consists in the provision of means for heating the conveyor structure to prevent freezing of the water which drains from the cinders as they are carried from the receiving to the discharge end of the conveyor.

Other improvements, advantages and characteristic features of the invention will be more readily understood from the following detailed description of the accompanying drawings, in which—

Fig. 3 is an elevational view of the frame member which supports the conveyor assembly adjacent the discharge end.

Figure 1:
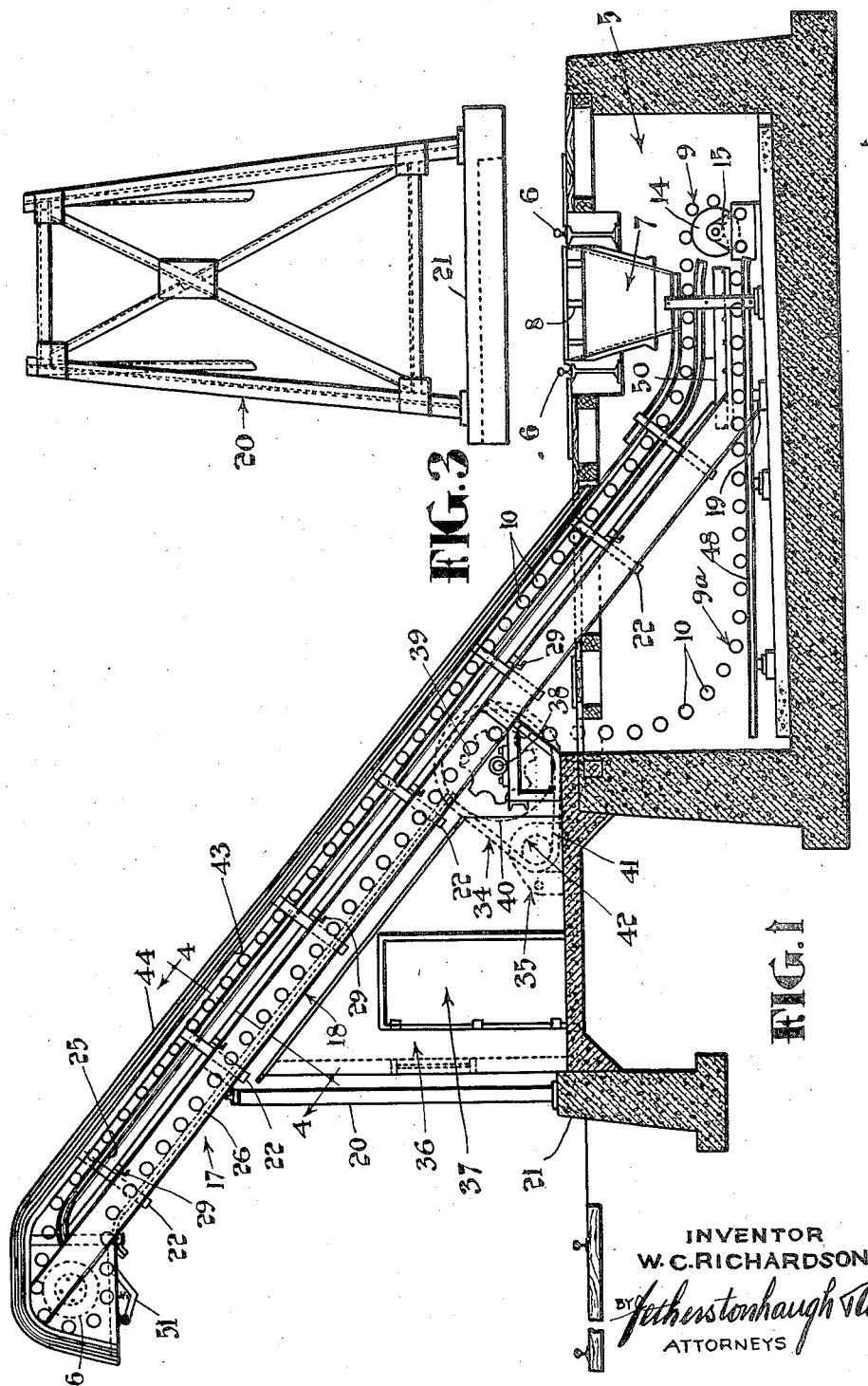
Fig. 1 is a view partly in side elevation and partly in vertical section of a cinder plant installation embodying my invention.
Figure 2:
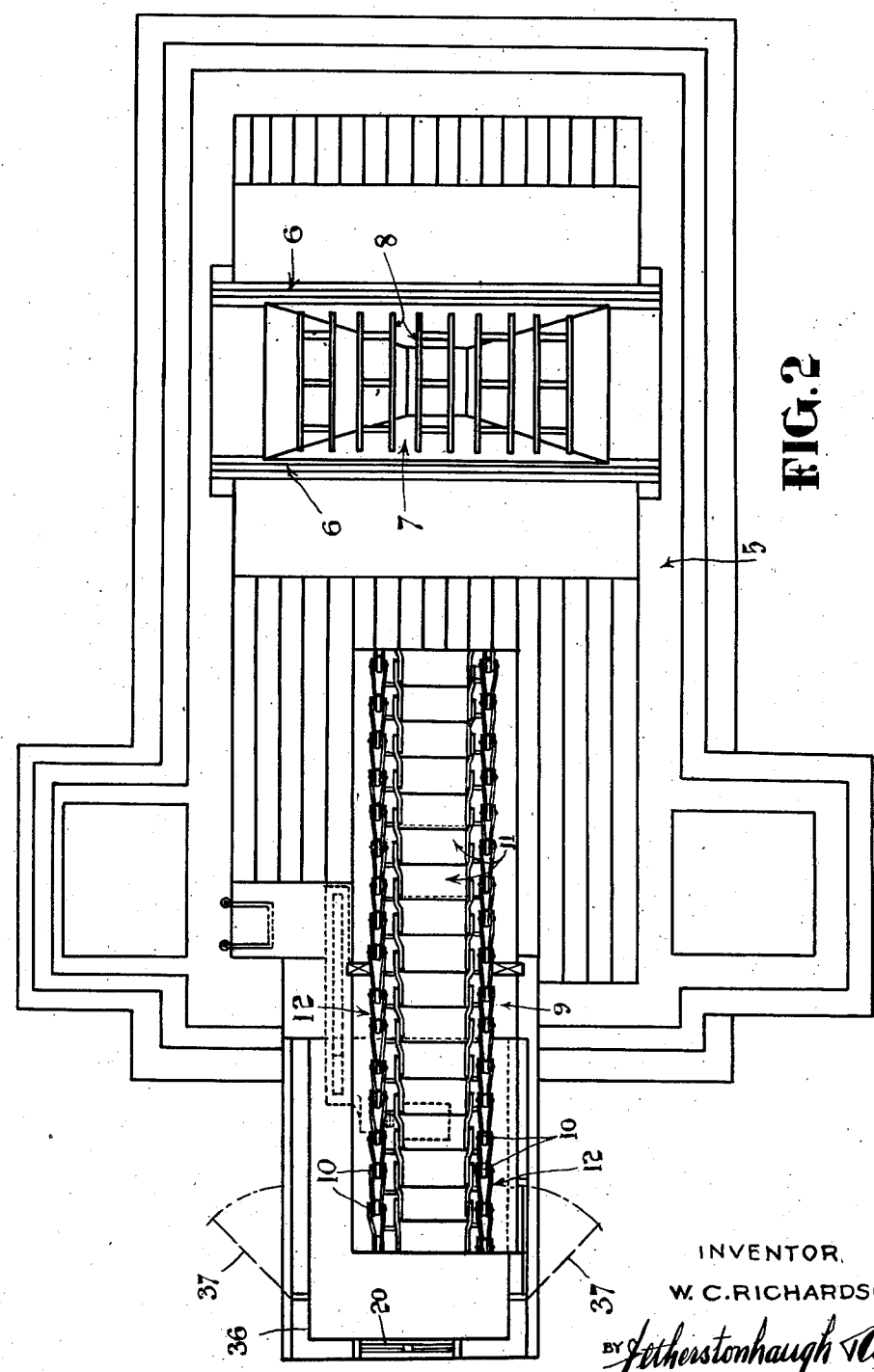
Fig. 2 is a partial plan view of the installation shown in Fig. 1.

Referring more particularly to the drawings, 5 designates a cinder pit located below track rails 6 over which a locomotive (not shown) is run to a cinder discharge position above a hopper 7. The hopper is located between the rails 6 and extends downwardly into the pit 5. This hopper is preferably provided with a safety grating 8 to prevent persons falling therethrough. The cinders discharged from the locomotive drop through the hopper 7 onto the underlying receiving end of an endless conveyor 9 which is shown in plan in Fig. 2 and is diagrammatically represented in Fig. 1 by the endless series of conveyor supporting rollers 10.

The component parts of the conveyor 9 are designed and assembled in exactly the same manner as the component parts of the conveyor shown in my previously mentioned prior patent. It is therefore deemed sufficient for present purposes to point out that the conveyor comprises an endless series of articulated cinder conveying pans 11 (Fig. 2) carried between two double-link supporting chains 12 which carry the supporting rollers 10.

At the receiving end of the conveyor the rollers 10 are trained around an idler 14 journaled in suitable bearing brackets 15 located below and at one side of the hopper 7. At the discharge end of the conveyor the rollers 10 are trained around an idler 16 suitably journalled at the upper end of the vertically inclined conveyor supporting structure generally indicated at 17.

Figure 4:
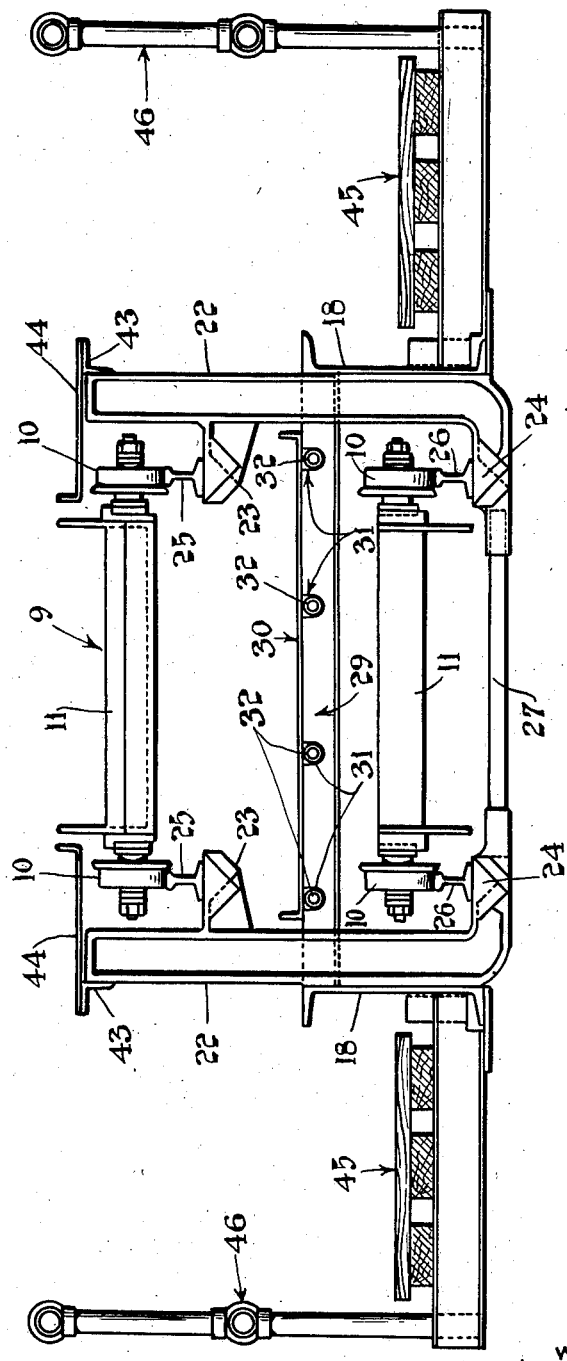
Fig. 4 is a sectional view taken substantially along the line 4—4 of Fig. 1.

The conveyor supporting structure 17 comprises laterally spaced, vertically inclined channel members 18 whose lower ends extend downwardly into the pit 5 and are fastened to suitable anchor members 19 located on the bottom wall of the pit at the side of the hopper 7 remote from the idler 14. Adjacent their upper ends the channel members 18 are supported by a suitably braced frame structure 20 rising from a concrete footing 21. Standards 22 are fastened to each of the channel members 18 at suitable intervals. These standards, as shown more particularly in Fig. 4, are provided with upper brackets 23 and lower brackets 24. The brackets 23 carry upper conveyor guide rails 25 while the brackets 24 carry lower conveyor guide rails 26. The standards carried by one channel member 18 are paired with correspondingly located standards carried by the opposite channel member 18, the lower ends of the standards of each conveyor being preferably joined together by tie rods 27. The channel members 18 are also joined together by a series of spaced, transversely extending channel irons 29 which support a drain pan 30. The pan supporting flanges of the channel irons 29 are notched as at 31 for the passage therethrough of a plurality of heating pipes 32 through which steam is passed to heat the drain pan 30.

The conveyor 9 is driven so that the rollers 10 of the upper flight travel upwardly on the upper track rails 25 while the rollers 10 of the lower flight travel downwardly on the lower track rails 26. The upper track rails 25 extend from a point close to the lower idler 14 to a point close to the upper idler 16. The lower track rails 26, however, extend only a relatively short distance downwardly from a point adjacent the upper idler 16. The lower ends of the track rails 26 terminate adjacent a chain guard 34 which covers the drive connection provided between the conveyor and the conveyor driving motor 35, the latter being preferably located within a suitable housing 36 provided with a door 37.

The motor 35 is a multiple speed electric motor which may be selectively operated at any one of several definite predetermined speeds. The drive connection between the motor and the conveyor is here shown as comprising a shaft 38 carrying sprocket wheels 39 which engage and drive the supporting rolls 10 of the conveyor as the latter travel downwardly between the lower ends of the rails 26. Shaft 38 carries a relatively large sprocket 40 which is driven by chain 41 from the motor sprocket 42.

The standards 22 carry brackets 43 to which cover plates 44 are secured. These cover plates extend inwardly over the conveyor rollers 10 and the upper conveyor guide rails 25. Catwalks 45 equipped with hand rails 46 may also be suitably secured to the channel members 18 of the conveyor supporting structure.

The conveyor 9 is trained around the idlers 14 and 16 so that there is considerable slack in the return flight of the conveyor between the idler 14 and the conveyor driving sprockets 39. This slack portion of the conveyor is indicated at 9a in Fig. 1 and the rollers 10 thereof travel over horizontal track rails 48 supported on the bottom wall of the pit 5. The track rails 48 are supported so that they have a slight downward inclination toward the idler 14.

A drainage deflecting guard plate 50 is arranged beneath the hopper 7 so that it overlies the lower flight of the conveyor in a position to receive thereon the drainage discharged from the lower end of the drain pan 30. The plate 50 serves to deflect the drainage toward portions of the pit lying at opposite sides of the conveyor and prevents it from falling directly onto the lower flight of the conveyor. A pivotally mounted spring pressed scraper 51 is carried by the upper end of the conveyor supporting structure and serves to scrape the conveyor pans 11 as the latter pass in inverted position around the upper idler 16.

The present invention, as described herein, provides a simple and economical arrangement for use in those instances where it is desired to provide only a single hopper for discharging cinders from one locomotive at a time. As previously stated, this simple arrangement eliminates the tower structure provided in the arrangement disclosed in my prior Canadian patent and enables the driving mechanism to be conveniently located at grade level. It will be understood, however, that the driving mechanism of the present invention may, if advisable, be mounted in a tower of the type shown in my prior patent and that various other features of the invention, such as the multiple speed drive mechanism and the steam pipes for heating the drain pan 30, may also be used in an installation of the type described in my prior patent. It will also be understood that the arrangement provided by the present invention may be modified to permit cinders to be simultaneously discharged from several locomotives onto the receiving end of the conveyor. In the latter event it is merely necessary to lengthen the pit and the receiving end of the conveyor and to provide additional hoppers 7.

Having thus described what I now consider to be the preferred embodiment of my invention it will be understood that other modifications may be resorted to within the scope and spirit of the invention as defined by the appended claims.

I claim:

1. A cinder plant comprising a pit, a hopper through which cinders are dropped into said pit, a lower idler roll arranged in the pit below and to one side of the hopper, an upper idler roll located a substantial distance above and to one side of the pit, the upper idler roll being also located at the opposite side of the hopper from the lower idler roll, an endless cinder conveyor trained around said idlers, a pair of vertically inclined, laterally spaced frame members lying at opposite sides of said conveyor, said inclined frame members carrying the upper idler roll between their upper ends and having their lower ends anchored to the bottom of the pit at the opposite side of the hopper from the lower idler roll, a pair of upper track rails carried by said inclined frame members and extending longitudinally thereof, said upper track rails extending downwardly from a point adjacent the upper idler roll to a point adjacent the lower end of the inclined frame members and being then directed horizontally beneath the hopper to a point adjacent the lower idler roll, a pair of lower track rails also carried by and extending longitudinally of said inclined frame members, said lower track rails extending downwardly from a point adjacent the upper idler roll to a point located above and to one side of the pit opening, an additional pair of track rails located on the bottom wall of the pit and extending from a point adjacent the lower idler roll to a point adjacent that side of the pit which is nearest the lower ends of the lower track rails carried by said inclined frame members, said conveyor being provided with supporting rollers which run on said track rails, the rollers of the upper flight of the conveyor running on the horizontal and inclined portions of the upper track rails carried by said inclined frame members while the rollers of the lower flight of said conveyor run on the lower track rails carried by said inclined frame members and on the track rails mounted on the bottom wall of said pit, driving sprockets arranged adjacent the lower ends of the lower track rails carried by said inclined frame members to engage the lower rollers of the conveyor and thereby drive the conveyor in a direction such that the upper flight of the conveyor travels upwardly along the inclined frame members, the portion of the lower flight of the conveyor located between the drive sprockets and the lower idler roll being sagged so that the rollers thereof travel on the rails mounted on the bottom wall of the pit.

2. A cinder plant as set forth in claim 1, in which the inclined frame members are supported at a point below but adjacent to their upper ends by an underlying vertically extending supporting frame.

3. A cinder plant as set forth in claim 1, including a pan carried by said inclined frame members and located below the upper flight of said conveyor and heating conduits located below and close to the bottom wall of said pan.

4. A cinder plant as set forth in claim 1, including cross members extending between said inclined frame members, a pan carried by said cross members and underlying the upper flight of the conveyor and heating conduits positioned below and close to the bottom wall of said pan, said heating conduits extending through openings provided in said cross members and being supported by said cross members.

5. A cinder plant as set forth in claim 1, including multiple speed driving mechanism selectively operable to drive said sprockets at one of several predetermined speeds.

6. In a cinder disposal plant of the character described the combination of an endless conveyor, conveyor supporting frame members lying at opposite sides of said conveyor, cross members connecting said frame members and arranged between the upper and lower flights of the conveyor, a pan supported on said cross members and underlying the upper flight of the conveyor and heating conduits positioned below and close to the bottom of the pan, said conduits extending through openings in said cross members and being supported by the latter.

7. A cinder disposal plant of the character described comprising a pit, a hopper through which cinders are dropped into said pit, an upper pair of vertically inclined track rails having horizontally directed lower end portions located within said pit and extending beneath said hopper, the upper ends of said rails being positioned a substantial distance above and to one side of the hopper, a lower pair of vertically inclined track rails underlying the upper rails and extending downwardly from a point adjacent the upper ends of the upper rails to a point located above and to one side of the point where the upper rails extend downwardly into said pit, an additional pair of substantially horizontal track rails mounted on the bottom wall of the pit and underlying portions of the upper pair of inclined track rails which extend downwardly beyond the lower ends of the lower pair of inclined track rails, and an endless conveyor trained around upper and lower idlers located, respectively, adjacent the upper and lower ends of the upper pair of track rails, said conveyor being provided with supporting rolls and being arranged so that the rolls of the upper flight travel on the upper pair of inclined track rails while the rolls of the lower flight travel on the lower pair of inclined track rails and on the track rails mounted on the bottom wall of the pit, the lower flight of the conveyor being sagged between the lower ends of the lower pair of inclined track rails and the lower idler so that the supporting rolls of the sagged section are thereby brought into supporting engagement with the said rails mounted on the bottom wall of the pit.

8. Apparatus as set forth in claim 7 including a pair of inclined frame members carrying the upper idler between their upper ends and having their lower ends anchored to the bottom wall of said pit, standards carried by said frame members and equipped with brackets supporting said upper and lower pairs of inclined rails.

9. Apparatus as set forth in claim 7 including a pair of inclined frame members carrying the upper idler between their upper ends and having their lower ends anchored to the bottom wall of said pit, standards carried by said frame members and equipped with brackets supporting said upper and lower pairs of inclined walls, and guard plates overlying the side portions of the upper flight of the conveyor, said guard plates being carried by said standards.

WALTER C. RICHARDSON.